Figure 1:
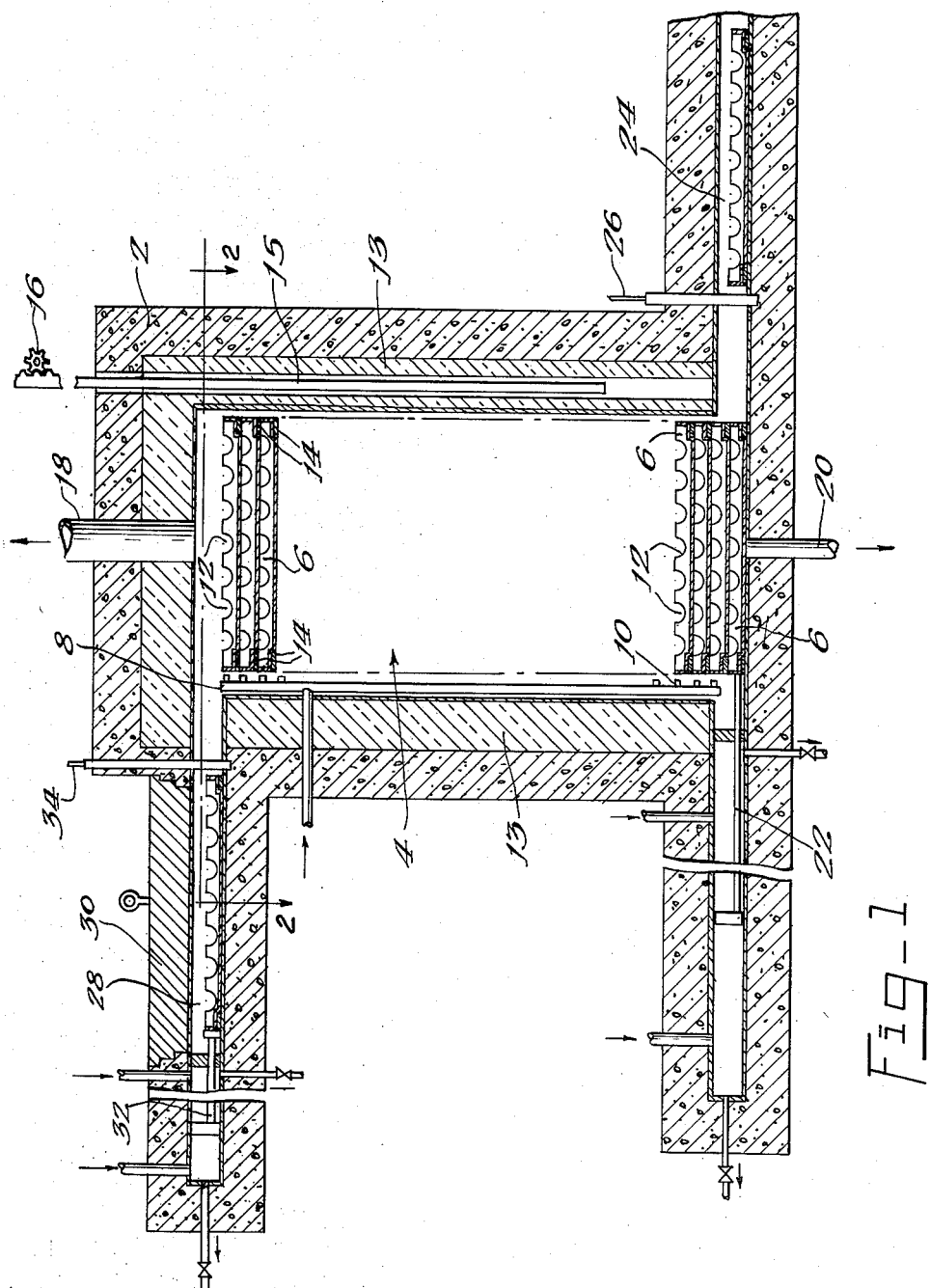

Oct. 8, 1957   H. E. METCALF   2,809,157
NEUTRONIC REACTOR
Filed Dec. 11, 1945   2 Sheets-Sheet 1

Witnesses:
Estill E. Ezell
Walter L. Schlegel, Jr.

Inventor:
Herbert E. Metcalf
By: Robert A. Lavender
Attorney

Oct. 8, 1957   H. E. METCALF   2,809,157
NEUTRONIC REACTOR
Filed Dec. 11, 1945   2 Sheets-Sheet 2

INVENTOR.
Herbert E. Metcalf
BY
Attorney

United States Patent Office 2,809,157
Patented Oct. 8, 1957

2,809,157

NEUTRONIC REACTOR

Herbert E. Metcalf, Chicago, Ill., assignor to the United States of America as represented by the United States Atomic Energy Commission Application December 11, 1945, Serial No. 634,317

1 Claim. (Cl. 204—193.2)

This invention relates to nuclear fission, and more particularly to a novel system for producing steam by a nuclear fission chain reaction in a system commonly known as a pile or reactor.

In neutronic reactors a neutron fissionable isotope such as $U^{233}$, $U^{235}$ or $94^{239}$ or mixtures thereof is subjected to fission by absorption of neutrons and a self-sustaining chain reaction is establishesd by the neutrons evolved by the fission. In general such reactors comprise bodies of compositions containing such fissionable material, for example, natural uranium, disposed in a neutron slowing material which slows the neutrons to thermal energies. Such a slowing material is termed a neutron moderator. Carbon, $D_2O$ (heavy water), and ordinary water are typical moderators suitable for such use. Heat is evolved during the reaction which is removed by passage of a coolant through the reactor in heat exchange relationship therewith. Specific details of the theory and essential characteristics of such reactors are set forth in copending application of Enrico Fermi and Leo Szilard, Serial No. 568,904, filed December 19, 1944, now Patent No. 2,708,656, and the manner of producing plutonium is shown in the copending application of Glenn T. Seaborg, Serial No. 481,660, filed April 3, 1943.

In neutronic reactors, the ratio of the fast neutrons produced in one generation by the fissions to the original number of fast neutrons in a theoretical system of infinite size where there can be no external loss of neutrons is called the reproduction or multiplication factor or constant of the system, and is denoted by the symbol K. For any finite system, some neutrons will escape from the periphery of the system. Consequently a system of finite size may be said to have a K constant, even though the value thereof would only exist if the system as built were extended to infinity without change of geometry or materials. Thus when K is referred to herein as a constant of a system of practical size, it always refers to what would exist in the same type of system of infinite size. If K can be made sufficiently greater than unity to indicate a net gain in neutrons in the theoretical system of infinite size, and then an actual system is built to be sufficiently large so that this gain is not entirely lost by leakage from the exterior surface of the system, then a self-sustaining chain reacting system of finite and practical size can be built to produce power and related by-products by nuclear fission of natural uranium. The neutron reproduction ratio in a system of finite size, therefore, differs from K by the external leakage factor, and by a factor due to the neutron absorption by localized neutron absorber, and the reproduction ratio must still be sufficiently greater than unity to permit the neutron density to rise exponentially with time in the system as built.

During the interchange of neutrons in a system of finite size, comprising bodies of any size disposed in a neutron moderator, neutrons may be lost to the chain reaction in four ways:

(1) By absorption or capture in the uranium content of the bodies without producing fission;
(2) By absorption or capture in the moderator material itself;
(3) By absorption or capture by the impurities present in both the uranium bodies and the moderator; and
(4) By leakage out of the system through the periphery thereof.

A general object of the invention is to provide a neutronic reactor comprising separable trays or layers formed of material containing fissionable substance, said trays being readily insertable into and removable from the reaction zone of the reactor.

Another object of the invention is to design an atomic power plant, such as above described, wherein the neutron moderator is in the form of a liquid, preferably ordinary water, disposed within the trays, said water being converted by the heat of the chain reaction to steam, which may be used for power or other purposes.

Still another object of the invention is to design a reactor as above set forth in which steam is efficiently produced in spaced relationship to the fissionable material in the trays, thereby preventing contamination of the steam and consequent complication of the associated apparatus.

Figure 2:
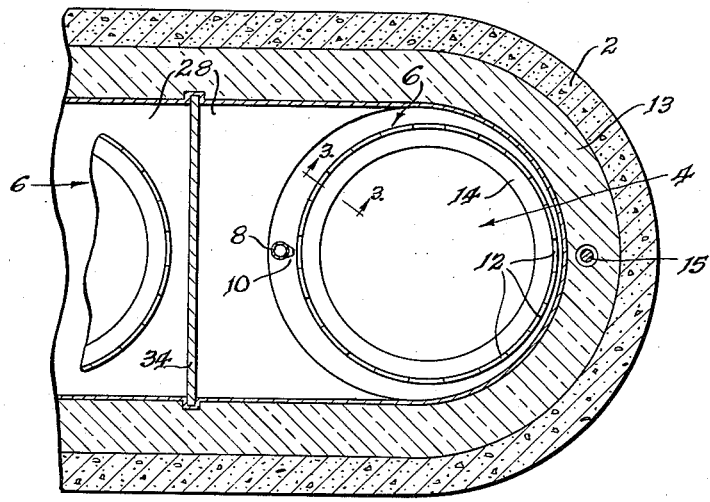
Figure 3:
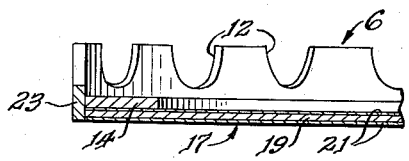

The foregoing and other objects and advantages of the invention will become apparent from a consideration of the following specification and the accompanying drawing, wherein Figure 1 is a diagrammatic sectional view of a reactor embodying the invention, the section being taken in a vertical plane approximately bisecting the structure, portions of the structure being shown in elevation; Figure 2 is a partial horizontal sectional view taken along the lines 2—2 of Figure 1; and Figure 3 is a detail sectional view taken along the lines 3—3 of Figure 2.

Describing the invention in detail, the novel atomic power plant comprises a concrete vault or chamber 2 containing the neutronic reactor, generally designated 4, said concrete vault 2 being adapted to absorb harmful emanations, such as alpha, beta, and gamma rays and neutrons.

The reactor 4 comprises a vertical pile or stack of cylindrical trays 6 containing neutron moderator, preferably in the form of ordinary water, supplied by a header 8 comprising outlets 10 adapted to communicate with respective trays.

Each tray 6 is cylindrical in form with the rim of the tray being scalloped as at 12 to accommodate passage of steam from the tray. A beryllium ring 14 is in the bottom of each tray at the outer periphery thereof to afford a relatively rigid structure which may be pushed into and out of the reaction zone in the vault 2, as hereinafter described in detail. The tray is preferably formed of a thin composite plate 17 comprising a central sheet 19, hot rolled between thin aluminum sheets 21, said central sheet 19 being an alloy of .08 atomic percent plutonium and aluminum, or plate 17 may consist of an aluminum base with a plating or paint of plutonium on the exterior. As shown in Figure 3, the bottom of the tray is formed of the above described composite plate 17, and the scalloped rim may be formed as a thin aluminum ring 23 welded to the bottom portion of the tray.

An operative reactor may be constructed, as above described, with about 4 kg. of plutonium, the reaction zone defined by the trays 6 being roughly cylindrical with a diameter and height of approximately 85 cm. The concentration of plutonium is preferably of the order of 28 mg./cm.$^2$, although, if desired, a greater concentration may be afforded by using a larger amount of plutonium. A reactor, constructed according to the above described specifications will contain approximately 1 molecule of fissionable plutonium for each 125 molecules of neutron moderator and 225 molecules of aluminum. Such an arrangement provides a minimum of moderator so that most of the neutrons in the reaction zone do not reach thermal energy, but cause fission of the fissionable plutonium ($Pu^{239}$) at not less than .5 e. v. By means of this arrangement, neutrons are conserved for the chain reaction, inasmuch as the capture to fission ratio for neutrons at the absorption resonance energy of .3 e. v. is .8 as compared with approximately .47 for neutrons at energies higher than .5 e. v. Furthermore, under these conditions only about .7% of the total neutrons within the reaction zone are absorbed in the water neutron moderator, and .6% of the neutrons in the reaction zone are absorbed in the aluminum, a much smaller percentage than would be absorbed in these two materials if more moderator were present. In this connection it may be noted that other fissionable isotopes, such as $U^{233}$, or $U^{235}$ may be substituted for plutonium without appreciably effecting the dimensions of an operative reactor.

As above noted, the trays and the water therein define a reaction zone within which the chain reaction is sustained, and said zone is surrounded by a reflector 13 of any suitable neutron scattering or moderating material, such as beryllium or graphite. It will be understood that the reflector is adapted to reflect neutrons escaping from the reaction zone back into said zone, thereby increasing the neutron reproduction ratio of the reactor. The reaction is controlled by a control rod 15 of cadmium, or any other neutron absorbent material, reciprocated within a complementary passage in the reflector 13, as by a rack and pinion mechanism 16.

The heat of the chain reaction continuously vaporizes the water in the trays 6, and the steam is conducted from the vault or chamber 2 by an outlet pipe 18. Additional water is supplied to the trays to replace the evaporated water by means of the before-mentioned header 8, thereby maintaining a substantially constant water level within the trays. Overflow water is conveyed from the vault 2 by a drain pipe 20.

It will be understood that as a result of the nuclear fission chain reaction, the fissionable material in the trays 6 is gradually used up, and fission products are formed. For this reason, it is necessary to replace the trays, not only for the purpose of providing additional fissionable material to sustain the chain reaction, but also to accommodate recovery of the fission products from the trays, which have been subjected to neutron bombardment during the chain reaction. This object is accomplished by a hydraulic pusher device 22, which pushes the tray at the bottom of the pile into an outlet chamber 24, which is provided with a suitable valve 26 which may be opened to accommodate movement of a tray into the outlet chamber 24. The trays are then removed from the outlet chamber and are processed to recover fission products of the reaction, as well as the unfissioned plutonium. Each time a tray is pushed from the bottom of the pile, a new tray may be inserted into an inlet chamber 28 through an opening normally closed by a lead door 30, and said tray is pushed to the top of the pile by a hydraulic pusher device 32. The inlet chamber 28 is provided with a suitable valve 34 similar to the before-mentioned valve 26.

While the theory of nuclear reactions set forth herein is based on the best presently known experimental evidence, the invention is not limited thereto as additional experimental data later discovered may modify the theory disclosed.

It will be understood that the illustrated embodiment of the invention is diagrammatic, and many modifications therein will be readily apparent to one skilled in the art without departing from the spirit of the invention or the scope of the appended claim.

What is claimed is:

A neutronic reactor comprising a vertical cylindrical chamber, a single vertical stack of shallow cylindrical trays containing water within said chamber, each tray being formed of a composite material consisting essentially of an alloy of .08 atomic percent plutonium in aluminum, encased in aluminum, said stack forming a cylindrical reaction zone having a diameter and height of approximately 85 centimeters and containing approximately one molecule of plutonium to each 125 molecules of water and 225 molecules aluminum said stack of trays containing a total of about 4 kilograms of plutonium this being sufficient to sustain a chain reaction, each tray having an apertured upper edge communicating with the free volume of the chamber to permit escape of steam into the chamber, a steam outlet pipe in the top of the chamber, and a water inlet conduit communicating with each tray to replace the water evaporated therefrom.

References Cited in the file of this patent

UNITED STATES PATENTS

| 1,346,158 | Baily et al. | July 13, 1920 |
| 1,996,526 | Serpas | Apr. 2, 1935 |
| 2,088,213 | Perkins | July 27, 1937 |
| 2,708,656 | Fermi et al. | May 17, 1955 |

FOREIGN PATENTS

| 114,150 | Australia | May 2, 1940 |
| 861,390 | France | Oct. 28, 1940 |
| 233,011 | Switzerland | Oct. 2, 1944 |

OTHER REFERENCES

Smyth: "Atomic Energy for Military Purposes" (August 1945).

Goodman: "The Science and Engineering of Nuclear Power," vol. 1, p. 275, Addison-Wesley (1947).

Kelly et al.: Phy. Rev. 73, 1135–9 (1948).